July 19, 1966  G. SALKOFF  3,261,307
LOCKING DEVICE FOR SERVING TABLES
Filed Feb. 8, 1965  2 Sheets-Sheet 2

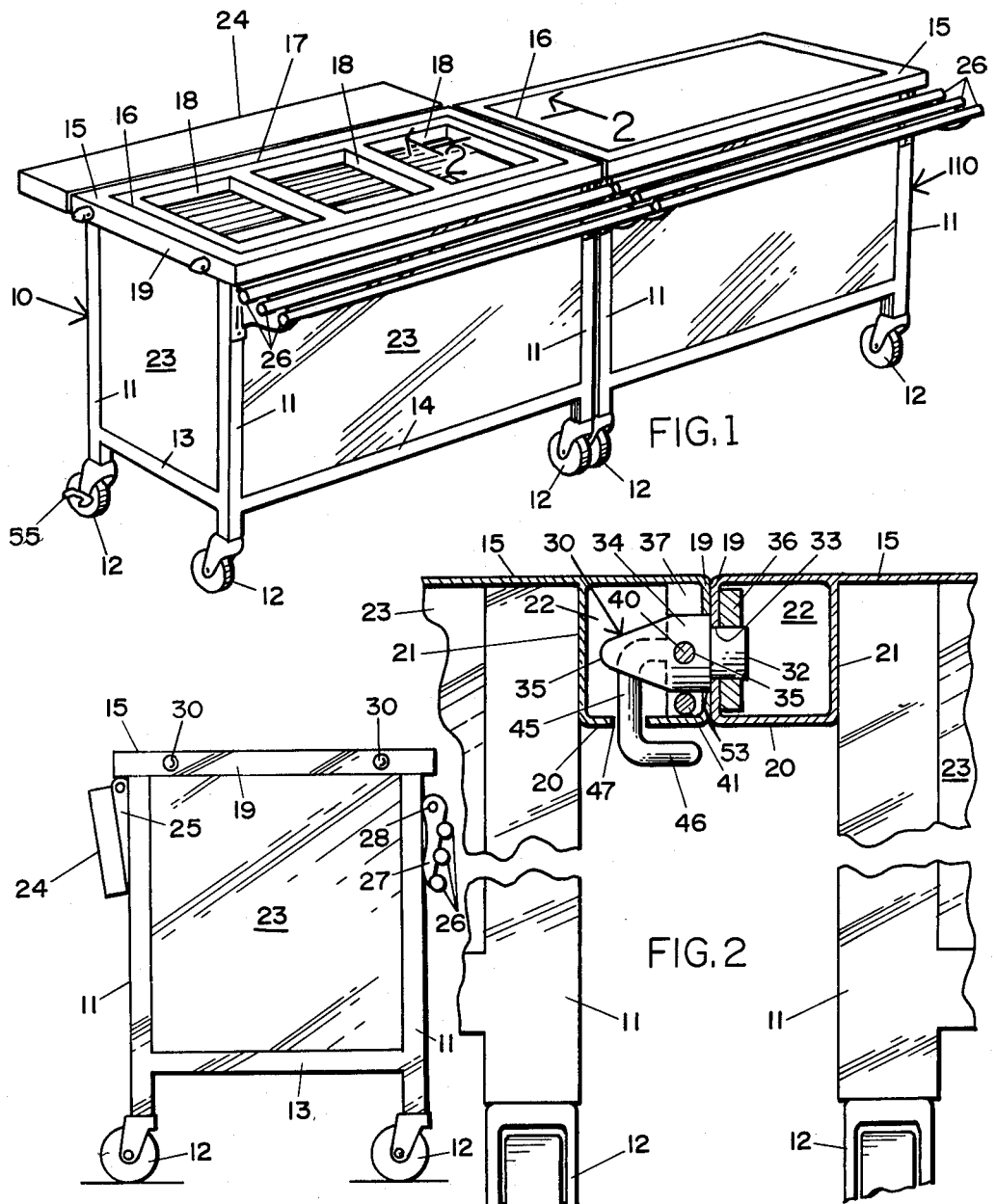

INVENTOR
GOODWIN SALKOFF

United States Patent Office 3,261,307
Patented July 19, 1966

3,261,307
LOCKING DEVICE FOR SERVING TABLES
Goodwin Salkoff, Coral Gables, Fla., assignor to Atlas Metal Industries, Inc., Hialeah, Fla.
Filed Feb. 8, 1965, Ser. No. 431,082
2 Claims. (Cl. 108—64)

This invention relates to locking device and is more particularly directed to a locking device for securing serving tables or counters together.

A principal object of the present invention is to provide a locking device for securing a plurality of serving tables and the like together end to end wherein the top surfaces thereof will be continuous, even and smooth notwithstanding that the surfaces upon which the counters are positioned may be faulty due to depressions or unevenness.

Another object of the present invention is to provide a locking device at each end of serving tables or counters whereby the counters may be positioned end to end in locked position readily and with ease as well as releasing the counters from each other by a simple movement of a handle.

A further object of the present invention is to provide locking devices at the ends of serving counters or tables that automatically lock the serving tables together upon placing them together end to end and upon actuating a handle, the tables are readily disengaged from each other.

A still further object of the present invention is to provide serving counters or tables with locking devices which are simple in construction, readily operated to lock together or separate tables and most effective to maintain the tables in an even and level position notwithstanding any depressions or uneven surfaces supporting the casters of the tables.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

FIGURE 1 is a perspective view of a plurality of serving counters or tables embodying my locking devices and shown connected together by the locking devices.

FIGURE 2 is a fragmentary cross sectional view taken along the line 2—2 of FIGURE 1.

FIGURE 6 is an end elevational view of the serving counter showing at the end of the counter housing the locking pin which is on the end opposite the locking mechanism shown by FIGURES 3 and 4.

Figure 3:
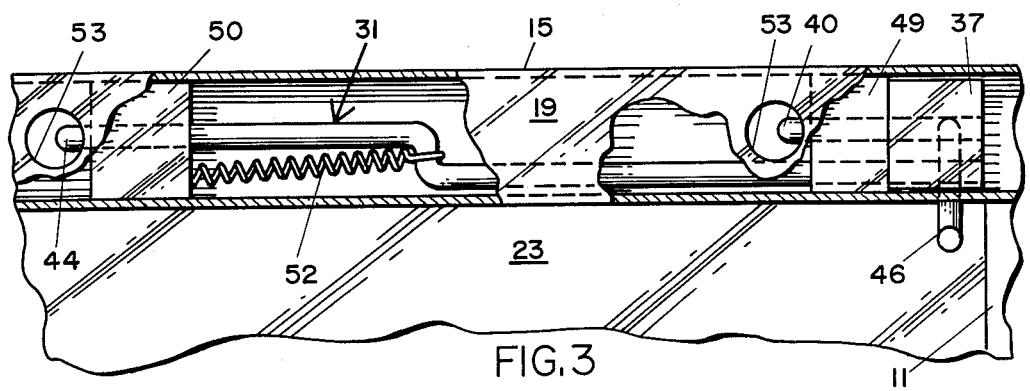
FIGURE 3 is a fragmentary end view of the serving counter with the end plate shown broken away in order to disclose the locking mechanism in the locked or normal position.
Figure 4:
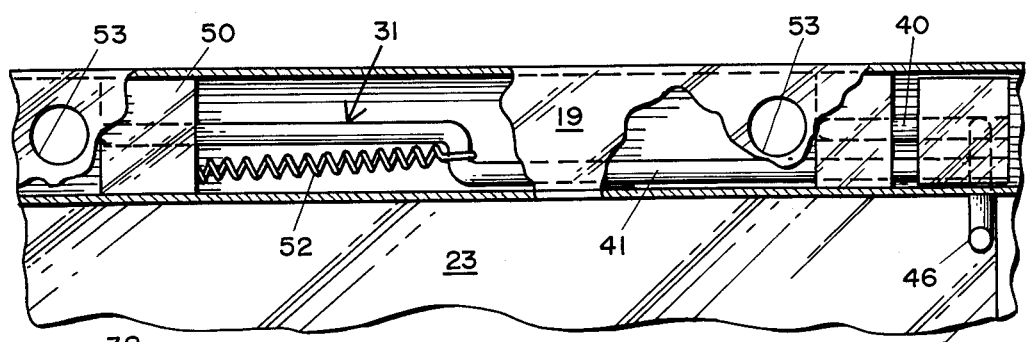
FIGURE 4 is a similar view showing the locking mechanism in the counter releasing position.
Figure 5:
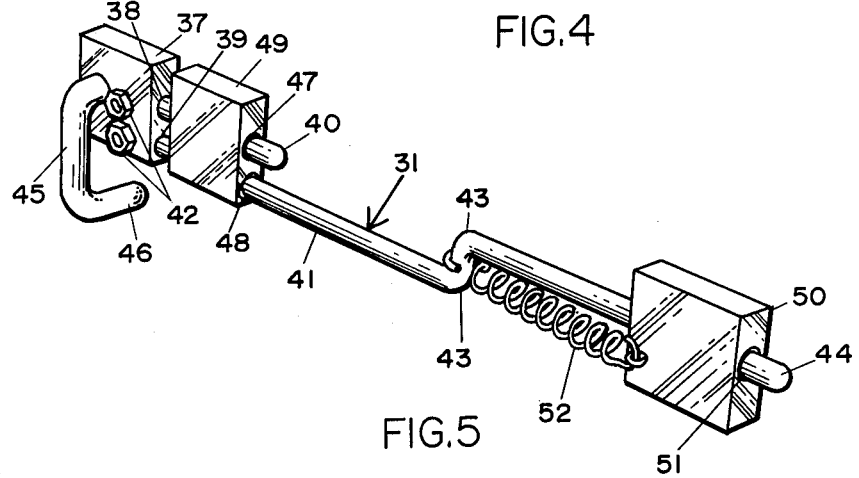
FIGURE 5 is a perspective view of the locking mechanism as shown removed from the counter.

Referring to the drawings wherein like numerals are used to designate similar parts throughout the several views, the numerals 10 and 110 refer to serving tables or counters constructed in accordance with my invention. Although the serving counters 10 and 110 appear to be somewhat different in construction, they are in truth identical and both of them have incorporated identically constructed locking devices. As is pointed out in detail hereinafter, their differences in structure reside in the type and number of food containing compartments which determine the particular use to which the counter is being appplied.

Each of the serving counters 10 and 110 consists of conventionally constructed portable cabinet structure having legs 11 on the lower end of which are mounted floor engaging casters 12. Horizontal braces 13 and 14 extend between the legs 11 at their lower portion while at the top is a top wall 15 having an enlarged opening 16 for receiving food trays 17.

It is to be noted that trays 17 may contain an assorted combination of openings depending on the kind and quantity of food to be contained therein and also whether the food is to be maintained in a heated or refrigerated condition. Within the openings 18 of the trays 17 are placed pans of food which are kept heated by a heating unit (not shown) contained in the tray 17. The opening 16 may receive a tray (not shown) which contains a refrigerating unit so that food placed in pans in the serving counter 110 may be kept cold.

The outer periphery of the table top 15 is rolled to form an outer edge wall 19, a bottom wall 20 and an inner wall 21 to form a chamber 22. The legs 11 are welded or otherwise secured to the inner walls 21. Sheet panelling 23 extend between the legs 11, braces 13 and 14 and the inner wall 21 and are welded thereto to form rigid and firm serving tables 10 and 110.

Along the rear edge of the serving tables 10 and 110 is a serving shelf 24 which is hinged as at 25 to permit the shelf 24 to be swung downwardly alongside the legs 11 when out of use and to swing up to a horizontal position in coplanar relation with the table top 15 to provide shelf and counter space when the serving tables 10 and 110 are in use. Along the front edges of the serving tables 10 and 110 is a plurality of tubular members 26 mounted on hinge members 27 in coplanar relation below the level of the top wall 15 to form a surface for supporting or sliding trays therealong. The tubular supporting members 27 are hinged as at 28 to the leg members 11.

The locking device for interlocking a plurality of serving counters 10, 110 together, which device is the essence of this invention, consists of a pair of pins 30 secured to one of the end outer edge walls 19 while on the end wall 19 at the opposite end of the serving tables 10, 110 is the pin interlocking member 31. The locking pins 30 consist of a shank portion 32 which extends through an opening 33 in the end wall 19. Attached to the shank portion 32 and engaging the outer surface of the end wall 19 is a body portion 34 that is provided with a bore 35 and a pointed head portion 35 being mounted on the body portion 34. The pin 35 is secured to the wall 19 by a pin 36 extending through a bore in the shank 32 and engaging the inner surface of the wall 19.

On the opposite end of the serving tables 10, 110 is the interlocking member 31 which is housed in the chamber 22. The interlocking member 31 consists of a sliding block member 37 slidably positioned within the chamber 22 along the inner surface of the wall 19. The block member 37 is provided with bores 38 and 39 which receive pins 40 and 41 that are secured therein by lock bolts 42. The pin 40 which is the shorter of the two pins is positioned at the mid height of the block member 37 while the longer pin 41 is bent as at 43, 43 to compel the end 44 of the pin 41 to become in axial alignment with relation to the pin 40. An arcuate handle 45 having one end secured to the slide block member 37 has its free end 46 extend through an opening 47 in the bottom wall 20 of the table top 15 for sliding the interlocking device in the chamber 22. The pins 40 and 41 are slidably positioned in bores 47 and 48 in a block 49 which is secured against movement in the guide block 49 by being welded to the inner surface of the wall 19. The block member 37 is provided with bores 38 and 39 which receive pins 40 and 41 that are secured therein by lock bolts 42. The pin 40 which is the shorter of the two pins is positioned at the mid height of the block member 37 while the longer 41 is bent as at 43, 43 to compel the end 44 of the pin 41 to become in axial alignment with relation to the pin 40. An arcuate handle 45 having one end secured to the slide block member 37 has its free end 46 extend through an opening 47 in the bottom wall 20 of the table top 15 for sliding the interlocking device in the chamber 22. The pins 40 and 41 are slidably positioned in the bores 47 and 48 in a block 49 which is secured against movement in the guide block 49 by being welded to the inner surface of the wall 19. Likewise the free end 44 of the pin 41 is slidably positioned in a bore 51 in the guide block 50 that is secured in the chamber 22 against movement. A coil spring 52 yieldingly maintains the interlocking device 31 in its locked position as is explained in detail hereinafter, extending from the guide block 50 to the bent portions 43, 43 of the pin 41. The end wall 19 is provided with a pair of openings 53 for receiving the locking pins 30 when serving tables 10 and 110 are to be locked together. To prevent the serving tables 10, 110 from moving on a floor when operating as serving counters, one of the casters 12 is provided with a conventional caster locking device 55 which when set will lock the caster 12 and prevent the table from rolling on the floor.

When it is desired to set up a line of serving tables 10, 110, they are placed end to end with the end walls 19 in abutting relation as the bores 53 receive the pins 30. It is to be noted that normally the locking pins 40 and 40 terminate short of the mid portion of the bores 53 so that as the pins 30 enter the bores 53 when placing the tables 10, 110 end to end, the pointed end 35 of the pins 30 force the locking pins 40, 44 away from the bores 53 against the coil spring pressure 52. As the walls 19 of the tables 10, 110 are brought to abutting relation the bores 35 of the pins 30 will become aligned with the locking pins 40, 44 and the spring 52 will force the locking pins 40, 44 to slide into the bores 35 and thereby lock the tables 10, 110 together. The tables 10, 110 will now be in alignment with each other and the table tops 15 as well as the counters 24 and serving tray receiving shelves 26 when swung upwardly to their serving positions will be aligned and level. Notwithstanding the surface on which the tables 10, 110 are set, the interlocking devices 30, 31 will bring the table tops 15 to an aligned and even position to provide a continuous surface to the serving and tray counters 24 and 26. If there were a depression or uneven surface under one or more of the casters 12, my locking device will prevent the tables 10, 110 from dipping downwardly but will, in fact, support the particular caster off the surface to maintain the tables in an even position.

When it is desired to remove the tables from their end to end position, all that need be done is to reach under the end of the table, grasp the handle 46 and slide it in the direction of the adjacent leg 46. The locking pins 40, 44 will slide away from their position in the bores 35 in the pins 30 until free therefrom. The tables 10 and 110 are now free of each other so that upon separating the tables, and releasing the handle 46, the locking pins 40 and 44 will slide back to their original position by virtue of the coil spring 52 to the position shown by FIGURE 3, ready to be reengaged by the pins 30 if and when tables 10, 110 are to be locked together again.

Having disclosed my invention, what I claim as new and desire to secure by Letters Patent of the United States is:

1. In a plurality of serving tables each having a table top, an end wall at opposite ends of said table top and a pair of aligned bores at each end wall, the combination comprising a lock pin mounted in each of said bores of one of said end walls and extending outwardly of said end wall to be received by said bores of the other of said end walls of a further serving table, and lock pins each having a cone shaped end portion and a transversely disposed bore, a plurality of guide blocks secured to the other of said end walls, said guide blocks having bores extending therethrough, a supporting block slidably positioned along said other of said end walls, a plurality of locking pins secured at one end to said supporting block and slidably positioned in said bores in said guide blocks, said locking pins having end portions positioned within the circumference of said bores in said other of said end walls and received by said bores in said lock pins when a plurality of serving tables are locked together, spring means yieldingly maintaining said locking pin end portions in said position and handle means for sliding said locking pin end portions out of said bores in said lock pins whereby said serving tables are released from each other.

2. The structure as recited by claim 1 wherein said lock pins have a cone shaped end portion whereby upon said lock pins of one serving table are being received by said bores of an end wall of an adjacent table, said locking pin end portions are slidably moved against said coil spring by said cone shaped end portion until said lock pins have fully entered said bores of said end wall, said locking pin end portions are received by said transverse bores in said lock pins to secure said adjacent serving tables together.

References Cited by the Examiner
UNITED STATES PATENTS

| | | | |
|---|---|---|---|
| 402,768 | 5/1889 | Reinisch | 292—162 |
| 692,047 | 1/1902 | Bronson | 292—175 |
| 1,259,397 | 3/1918 | Hathaway | 296—35 |
| 1,436,836 | 11/1922 | Wagstaff | 292—175 |
| 2,200,346 | 5/1940 | Sepull | 292—175 |
| 2,403,338 | 7/1946 | Butler | 108—64 |
| 2,596,663 | 5/1952 | Duffy | 108—69 |
| 2,636,631 | 4/1953 | Williams | 292—162 |
| 2,872,259 | 2/1959 | Thorpe | 108—69 |

FRANK B. SHERRY, *Primary Examiner.*

F. K. ZUGEL, *Assistant Examiner.*